United States Patent [19]

Eckstein

[11] Patent Number: 4,653,695
[45] Date of Patent: Mar. 31, 1987

[54] PRESSURE COMPENSATING DRIP IRRIGATION EMITTER

[75] Inventor: Gershon Eckstein, Fresno, Calif.

[73] Assignee: Drip Irrigation Systems, Ltd., Cyprus

[21] Appl. No.: 774,797

[22] Filed: Sep. 11, 1985

[51] Int. Cl.[4] ............................................. B05B 1/30
[52] U.S. Cl. ..................................... 239/542; 239/109; 239/272; 251/126; 138/42
[58] Field of Search ............... 239/270, 271, 272, 542, 239/541, 138, 108, 109; 251/126; 138/40, 42, 43

[56] References Cited

U.S. PATENT DOCUMENTS

| | | | |
|---|---|---|---|
| 3,685,735 | 8/1972 | Foster | 239/542 |
| 3,719,327 | 3/1973 | McMahan | 239/454 |
| 3,729,142 | 4/1973 | Rangel-Garza et al. | 239/542 |
| 3,767,124 | 10/1973 | Spencer | 239/542 |
| 3,799,441 | 3/1974 | Delmer | 239/145 |
| 3,804,334 | 4/1974 | Curry | 239/276 |
| 3,833,176 | 9/1974 | Caldwell | 239/542 |
| 3,851,896 | 12/1974 | Olson | 239/542 |
| 3,876,155 | 4/1975 | Ruben | 239/542 |
| 3,882,892 | 5/1975 | Menzel | 137/513.3 |
| 3,897,009 | 7/1975 | Rangel-Garza et al. | 239/542 |
| 3,899,136 | 8/1975 | Harmony | 239/534 |
| 3,908,694 | 9/1975 | Spears | 137/513.3 |
| 3,912,165 | 10/1975 | Pira | 239/11 |
| 3,917,169 | 11/1975 | Harmony | 239/107 |
| 3,934,824 | 1/1976 | Fitzhugh | 239/534 |
| 3,954,223 | 5/1976 | Wichman et al. | 239/109 |
| 3,974,853 | 8/1976 | Bentley | 239/542 |
| 3,993,248 | 11/1976 | Harmony | 239/107 |
| 4,009,832 | 3/1977 | Tiedt | 239/542 |
| 4,011,893 | 3/1977 | Bentley | 138/43 |
| 4,023,595 | 5/1977 | Zakay | 138/45 |
| 4,077,571 | 3/1978 | Harmony | 239/107 |
| 4,132,364 | 1/1979 | Harmony | 239/542 |
| 4,143,820 | 3/1979 | Bright, Sr. | 239/108 |
| 4,147,307 | 4/1979 | Christy et al. | 239/542 |
| 4,210,287 | 7/1980 | Mehoudar | 239/542 |
| 4,223,838 | 9/1980 | Maria-Vittorio-Torrisi | 239/109 |
| 4,235,380 | 11/1980 | Delmer | 239/450 |
| 4,254,791 | 3/1981 | Bron | 137/118 |
| 4,307,841 | 12/1981 | Mehoudar et al. | 239/542 |
| 4,344,576 | 8/1982 | Smith | 239/542 |
| 4,354,639 | 10/1982 | Delmer | 239/542 |

Primary Examiner—Joseph F. Peters, Jr.
Assistant Examiner—Scott D. Malpede
Attorney, Agent, or Firm—Cushman, Darby & Cushman

[57] ABSTRACT

A drip irrigation emitter which provides for varying the length of the water flow path through the emitter in proportion to the pressure applied to it from the irrigation system. A housing defines an internal chamber in which a piston is disposed. The housing has an inlet at one end and an outlet at the other end. The inner dimensions of the outlet end of the housing are reduced to generally conform with the periphery of the piston. The inlet end of the chamber is enlarged relative to the piston to allow generally free flow of water therearound. A generally helical groove extending along the periphery of the piston forms a water turbulence-producing passageway which varies in length depending upon the position of the piston within the outlet end of the chamber. A spring biases the piston toward the inlet end of the chamber. Pressurized water in the inlet end of the chamber moves the piston against the spring toward the outlet end. The piston position, and therefore water passageway length, is directly proportional to the water pressure. Water flow at lower water pressures may also be controlled by providing a cavity in the chamber adjacent the inlet which mates with a corresponding extending end of the piston. A channel extending along the piston end limits the fluid flow until fluid pressure forces the piston end out of the cavity.

15 Claims, 7 Drawing Figures

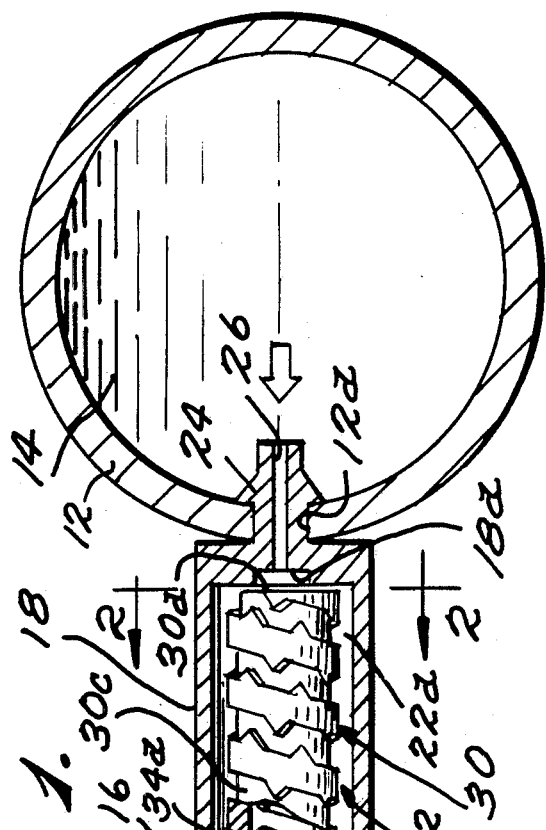
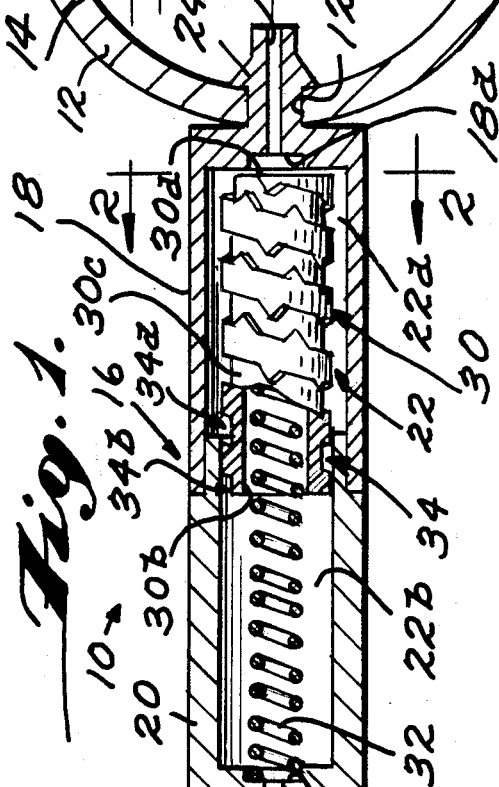
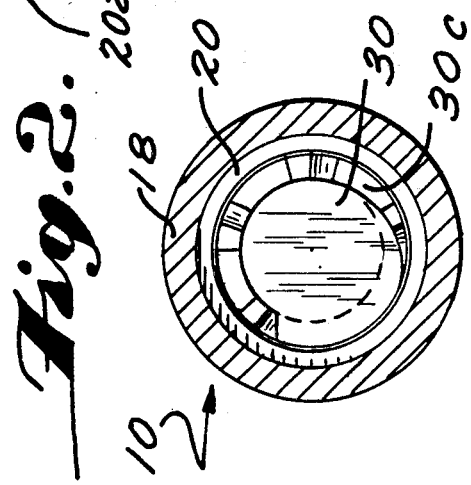
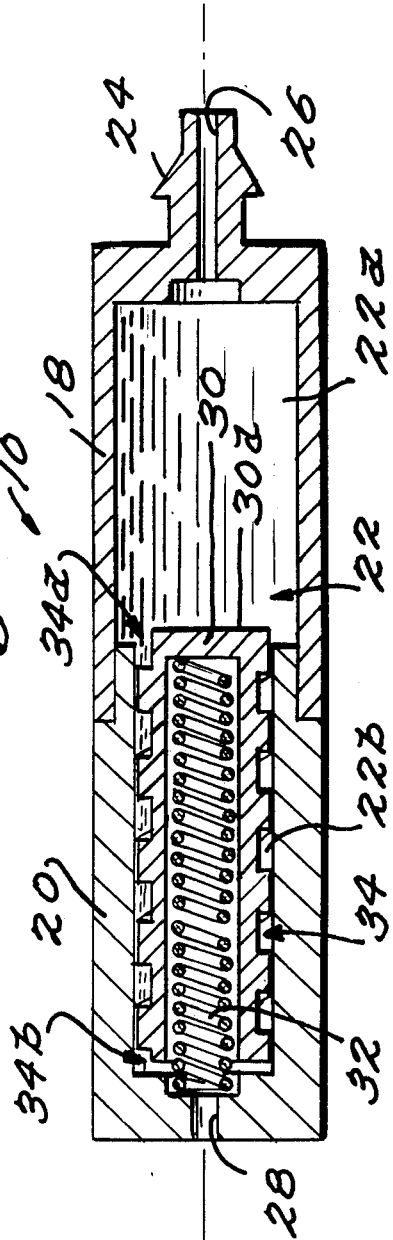

PRESSURE COMPENSATING DRIP IRRIGATION EMITTER

BACKGROUND OF THE INVENTION

The present invention relates generally to emitters for drip irrigation systems, and more particularly, to such emitters which are pressure compensating to apply controlled water distribution to vegetation at relatively low rates of flow while automatically compensating for varying pressures in the water supply system. The amount of water emitted remains substantially constant despite fluctuations in the supplied water pressure.

A drip irrigation system provides application of water to specific plant or root zone locations in controlled quantities. It is thereby possible to irrigate planted areas with substantially less water than is used by general broadcast sprinkler or flooding methods. However, if the same non-pressure compensating emitter is used at all drip locations, those emitters in the irrigation system which are subject to higher water pressure release more water. There is thus uneven water distribution.

In order to overcome this problem, pressure-compensating emitters were developed which allow a fairly uniform water flow over a range of water pressures within the irrigation system. The following U.S. patents disclose many of the typical techniques which are currently used:

| U.S. Pat. No. | Inventor(s) |
| --- | --- |
| 3,719,327 | McMahan |
| 3,767,124 | Spencer |
| 3,799,441 | Delmer |
| 3,804,334 | Curry |
| 3,833,176 | Caldwell |
| 3,876,155 | Ruben |
| 3,882,892 | Menzel |
| 3,899,136 | Harmony |
| 3,908,694 | Spears |
| 3,912,165 | Pira |
| 3,917,169 | Harmony |
| 3,934,824 | Fitzhugh |
| 3,954,223 | Wichman et al. |
| 3,993,248 | Harmony |
| 4,009,832 | Tiedt |
| 4,011,893 | Bentley |
| 4,023,595 | Zakay |
| 4,077,571 | Harmony |
| 4,132,364 | Harmony |
| 4,143,820 | Bright, Sr. |
| 4,147,307 | Christy et al. |
| 4,210,287 | Mehoudar |
| 4,235,380 | Delmer |
| 4,254,791 | Bron |
| 4,307,841 | Mehoudar et al. |
| 4,344,576 | Smith |
| 4,354,639 | Delmer |

These patents disclose the use of elements which restrict a flow path or distorts water outlets in order to limit the flow rate. Typically, a diaphragm or flexible membrane is disposed so that, in response to water pressure fluctuation, the diaphragm or membrane flexes into a region through which water flows. Thus, as water pressure increases, the membrane deforms into the corresponding flow channel, reducing the sectional area of flow path and restricting flow. The result is, if the emitter is properly designed, a generally uniform flow rate for a range of water pressures.

These types of emitters have some inherent problems. They are sensitive to clogging, because of sediment collecting in the restricted flow paths. Further, they typically utilize elastomeric or otherwise deformable material which is responsive to pressure applied to them. The membrane or diaphragm flexibility changes as a result of absorbing water. Also, during its operating period its flexibility or elasticity changes as a result of aging. These variations prevent the emitters from maintaining a constant output for the desired range of fluid pressures to which it is subject. The reliability and accuracy of the emitters is thereby adversely affected.

SUMMARY OF THE INVENTION

The present invention provides a drip irrigation emitter which is pressure-compensating without using flow restricting elements as applied in the presently existing art. In fact, the present invention provides an apparatus wherein the length of the emitter flow path is varied in proportion to the pressure applied to it from the irrigation system. The emitter does not vary the cross-sectional area of fluid flow, thereby avoiding many of the potential clogging problems existing in the typical pressure-compensating emitters.

In the preferred embodiments of the invention, means are provided for defining a fluid passageway which is formed by a pair of elements. The adjacent surfaces of the two elements are constructed such that the passageway varies in length as the two elements move relative to each other. Means are also provided for moving one of the elements relative to the other in response to changes in the pressurized fluid in the irrigation pipe to which such an emitter is attached. For high pressures, the path length is long, whereas at low pressures the path length is relatively short. The passageway is designed as a turbulence-producing labyrinth to have a relatively large cross-section, as compared to typical pressure-compensating emitters.

The two elements are preferably in the form of adjacent lateral surfaces of a piston and a cylinder in which the piston is disposed. Pressure applied from water in the irrigation pipe forces the piston through the cylinder, which force is offset by biasing means which yieldably urges the piston in a direction opposite to such force.

A drip emitter is thereby provided having a low probability of clogging, as mentioned earlier, as well as having components which are insensitive to the environment in which they function. These and other features and advantages of the present invention will be more clearly understood from a consideration of the drawings and the following detailed description of the preferred embodiment.

BRIEF DESCRIPTION OF THE DRAWINGS

With reference to the accompanying two sheets of drawings:

FIG. 1 is a cross-sectional view of a drip emitter made according to the present invention as attached to a typical drip irrigation pipe containing low pressure water;

FIG. 2 is a cross-sectional view of the emitter of FIG. 1 taken along line 2—2;

FIG. 3 is an enlarged cross-sectional view, similar to FIG. 1 without the irrigation pipe, showing the position of emitter components when subject to high pressure water;

DETAILED DESCRIPTION OF THE PREFERRED EMBODIMENT

Figure 4:
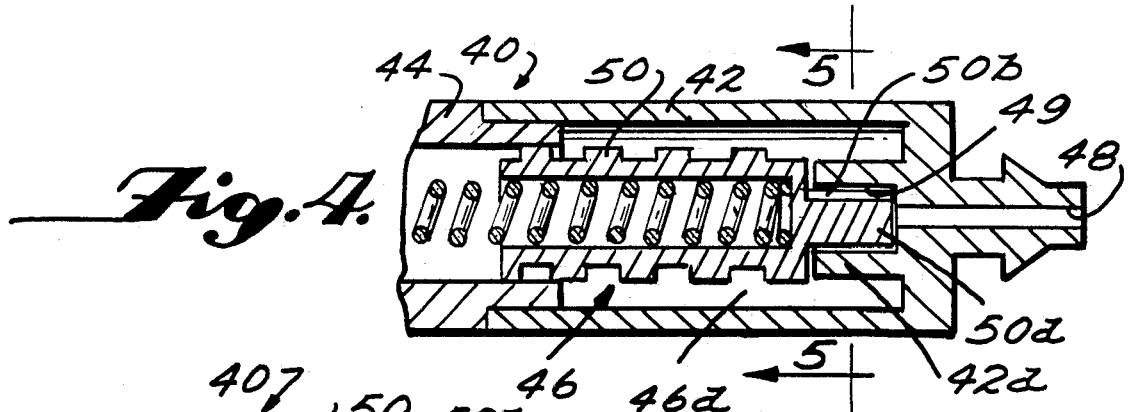
FIG. 4 is a fragmentary cross-sectional view of a second preferred embodiment, shown in an enlarged view similar to that of FIG. 1.

Referring initially to FIGS. 1-3, an emitter forming a first preferred embodiment of the present invention is shown generally at 10. In FIG. 1, emitter 10 is shown connected to an irrigation pipe 12 which, during operation, contains pressurized fluid or water 14. Pipe 12 has an aperture 12a which extends between the interior and exterior of the pipe.

Emitter 10 is made of conventional generally rigid materials and includes a housing, shown generally at 16, consisting of an inlet member 18 and an outlet member 20. Members 18, 20 are generally cylindrical in shape and are hollow so that, when joined as shown, provide means defining a housing. It will be appreciated that other functional shapes may also be used for housing 16. Members 18, 20 may be threadedly connected, heat bonded, or joined by other suitable conventional fluid sealing means. Housing 16 forms an internal chamber, shown generally at 22, including a relatively wide chamber inlet end 22a associated with inlet member 18 and a relatively narrow chamber outlet end 22b associated with outlet member 20.

Extending out of inlet member 18 is a stem 24 which is sized to extent through pipe aperture 12a in a fluid-tight manner, as is conventionally known. Stem 24 has an inlet 26 extending longitudinally through it so that communication is provided between the interior of pipe 12 and inlet chamber end 22a. A small recess 18a, which is larger than the diameter of inlet 26 is disposed at the mouth of inlet 26 where it enters chamber 22.

At the opposite end of housing 16 is an outlet 28. This outlet provides communication between chamber 22 via outlet end 22b and the exterior of both housing 16 and pipe 12.

Disposed for freely sliding movement within outlet end 22b is a plunger or piston 30. Piston 30 has a length such that when it is fully extended in inlet end 22a, substantially as shown in FIG. 1, a portion is still disposed within outlet end 22b. Piston 30 has an enclosed end 30a facing inlet 26. It also has an internal bore 30b in which is disposed means for biasing the piston toward inlet 26. This is a spring 32, preferably made of stainless steel to avoid corrosion, which extends from a recess 20a adjacent outlet 28 into bore 30b, as shown.

Means are provided by the invention for defining what is referred to herein as a first fluid turbulence passageway. This is provided by first and second elements which are movable relative to each other for varying the length of the turbulence passageway. This passageway, referred to generally at 34, is formed in part by a groove 30c which extends in a helical fashion in the outer lateral surface of piston 30 from what may be referred to as the outlet end of the piston toward the inlet or closed end 30a referred to earlier. The inner lateral surface of outlet member 20 is relatively smooth in this preferred embodiment and covers groove 30c to complete turbulence passageway 34.

It will be appreciated that passageway 34 has a generally constant effective cross-sectional area normal to the direction of fluid flow. This is shown in the preferred embodiment, particularly in FIGS. 1 and 3, by the generally constant width and height of the passageway along its length as defined by groove 30c and the inner lateral surface of outlet member 20.

Chamber inlet end 22a is enlarged relative to the piston so that water flowing from inlet 26 flows freely between inlet member 18 and piston 30, to passageway 34. It can be seen that passageway 34 has an end closest to inlet 26 which may be referred to as an inlet passageway end 34a. Inlet 26 and chamber inlet end 22a provide means for applying pressurized water to passageway end 34a. Similarly, there is an outlet end 34b associated with outlet 28.

The invention also includes means for moving one passageway-defining element relative to the other in response to pressurized water from an irrigation pipe. This is provided by housing 16 and piston 30 which is movable within chamber 22 along a piston axis 36 shown in dash dot line. It can be seen that groove 30c is formed as a labyrinth in that it has numerous curves or turns as it travels in a generally helical direction around piston 30 to provide turbulent flow. Outlet member 20 and piston 30 thus are two elements which move relative to each other to vary the length of turbulence passageway 34.

Certainly other forms of paths may also be envisioned which extend generally from one end of the piston to the other. Alternatively, the internal wall of outlet member 20 could have a groove formed in it, with the piston then having a relatively smooth surface. The important feature of this aspect of the preferred embodiment is that the length of turbulence passageway 34 is defined by the overlapping adjacent inner lateral surface of outlet member 20 and outer or peripheral lateral surface of piston 30 so that the passageway defined thereby extends progressively from one end of the piston toward the other.

During an irrigation operation, the position of piston 30 varies within chamber 22 depending on the pressure of water 14 within irrigation pipe 12. Piston 30 is in the position shown in FIG. 1 when there is very little or no water pressure in the pipe. There is a certain minimum level below which the water flows freely through passageway 34. As the pipe water pressure increases, the pressure within chamber inlet end 22a increases accordingly. Passageway 34 is restricted relative to the flow of water around piston 30 within inlet chamber end 22a for water pressure above the minimum level. Piston 30 is driven further into chamber outlet end 22b. Spring 32 makes the amount of travel of the piston directly proportional to the water pressure.

Referring now particularly to FIG. 3, the position of piston 30 is shown nearly completely within outlet member 20, a position resulting from a relatively high water pressure. With piston 30 in this position, the length of passageway 34 is quite long in comparison with the length it had in the position shown in FIG. 1.

As a practical matter, the outer lateral surface of piston 30 between the groove windings is not going to be fluid-tight relative to the inner lateral surface of outlet member 20, in order that the piston be reasonably freely slidable in outlet member 20. As a result, some water will pass along the outer periphery of the piston, in addition to flowing in the groove. It is simply necessary that this flow be taken into consideration when designing the groove. It will also be appreciated that the distance this "spill-over" water travels also increases with length as piston 30 travels down into chamber outlet end 22b. In its simplest form, then, an embodiment could be provided with a smooth sided piston which fits closely within the chamber. This, however, would require guides within the space between the piston and outlet member to control the spacing.

The following explanation will show that water flow rate as controlled by the preferred embodiment is independent of water pressure. It will be appreciated that the force ($F_w$) of the water under pressure in chamber inlet end 22a against piston 30 is equal to the fluid pressure (P) multiplied by the surface area (S) of piston 30, as viewed in FIG. 2, or $F_w = P \times S$. It is also known that the force of the spring ($F_s$) is equal to the distance of movement of the spring (X) times the spring constant (K), or $F_s = X \times K$. Setting the spring force equal to the water pressure force, at equilibrium, and solving for X the distance that the plunger or piston moves, we get $X = (P \times S)/K$.

It is also known that as piston 30 moves inside chamber outlet end 22b, the length of passageway 34 increases. Thus, the length (L) of the passageway is directly proportional to the movement (X) of piston 30, or $L \propto X$. We also know that there is a direct proportionality between the flow rate (Q) and the length (L) of passageway 34. Therefore, $Q \propto (P/L)$. Substituting L for X in the defining X equation and solving for P/L, we find that $Q \propto (K/S)$, or that flow rate is directly proportional to the spring constant divided by the surface area of the piston. Thus, the flow rate is not dependent on the water pressure.

Figure 5:
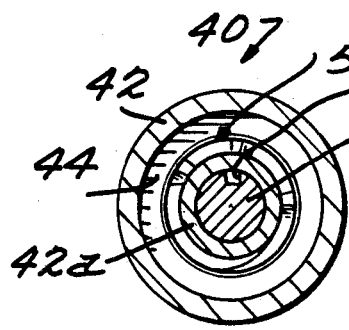
FIG. 5 is a cross-sectional view of the emitter of FIG. 4 taken along line 5—5.

Referring now to FIGS. 4, 5, a modification of the first preferred embodiment is shown which provides for movement of the piston at low water pressures. An emitter 40, similar to emitter 10, includes an inlet member 42, an outlet member 44, which together define a chamber 46 having an inlet end 46a. An inlet 48 extends through the inlet end. Also formed within the inlet end of chamber 46 is a cylindrical cup 42a defining a cavity sized to slidingly receive a mating extension 50a of a piston 50, which is otherwise made similar to piston 30. A small channel 50b extends longitudinally along the extension to provide limited fluid communication between inlet 48 and chamber 46. Channel 50b of extension 50a and cup 42a thus form a second passageway when piston 50 is in the position shown.

It can be seen that, at very low water pressure conditions, the embodiment shown in FIGS. 1-3, does not produce movement of piston 30 away from inlet 26 until a certain minimum water pressure is achieved. The piston of the embodiment shown in FIGS. 4, 5 is moved at water pressures below that minimum. In particular, because of the extremely limited passageway of water defined by channel 50b, the pressure of the water will build up on the end of extension 50a until the extension is pushed out of cavity 42a. After this, the piston moves as described with respect to the first embodiment. The second embodiment shown in FIGS. 4, 5 therefore has a dual mode operating capability. In one mode control over a low pressure range is provided. In a second mode, general control is provided over a larger higher pressure range.

It will be appreciated that it is not necessary that cavity 42a be smaller than the end of piston 50. In fact it could be the same size or larger, if the piston end is enlarged to conform and mate with the shape of cavity 42a. It is only necessary that there be a defined restriction of fluid flow between inlet 48 and chamber 46 over a defined length of piston movement. The size of channel 50b and the size of the extension end determine the minimum fluid pressure and range of pressures over which this low pressure flow regulator functions.

Figure 6:
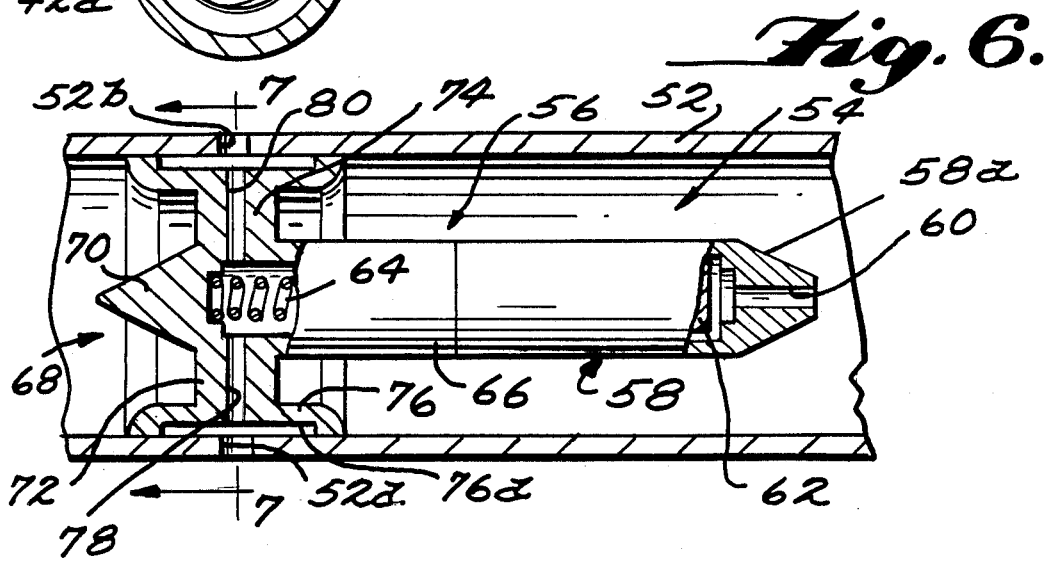
FIG. 6 is a further enlarged fragmentary cross-sectional view of the functional emitter of FIG. 1 having additional structure to provide for installation inside an irrigation pipe.
Figure 7:
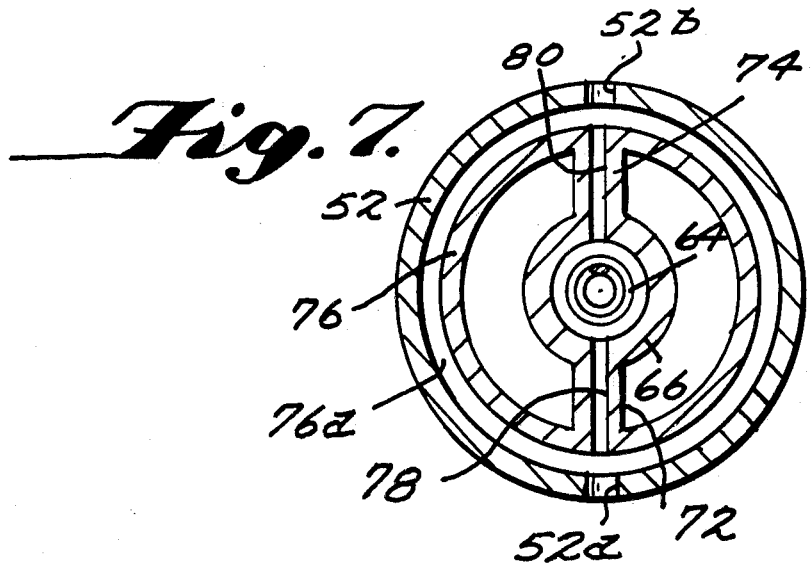
FIG. 7 is an enlarged cross-sectional view of the emitter and pipe of FIG. 6 taken along line 7—7.

Referring now to FIGS. 6, 7 a third embodiment of the invention is shown for installation inside of an irrigation pipe 52 having a pair of oppositely directed apertures 52a, 52b. An emitter, shown generally at 54, is similar in internal structure to the first embodiment. It includes a housing 56 including an inlet member 58 having a tapered nose 58a which tapers toward an inlet 60. A piston 62 and spring 64 are shown which are substantially identical with the piston and spring of the first embodiment. The piston and spring are disposed in an outlet member 66.

The invention also includes means for joining communicably the outlet end of the water passageway along the piston with the pipe aperture. This is provided by a mounting assembly, shown generally at 68, integrally joined to the outlet member. Assembly 68 includes a generally cone-shaped hub 70 which is designed to reduce the turbulence of water flowing past emitter 56. Hub 70 is integrally joined to outlet member 66 and to radially oppositely extending spokes 72, 74, shown most clearly in FIG. 7.

Means for retaining the emitter in the pipe are also included. This is provided by an annular rim 76 which is sized to fit securely within pipe 52 which is connected to the spokes. They are inserted in the conduit and held in place according to suitable methods, such as those described in my prior U.S. Pat. No. 3,981,452. Rim 76 includes an annular, outwardly exposed channel 76a which extends around the periphery of rim 76.

Channel 76a is disposed to be in communication with apertures 52a, 52b. Further, ducts 78, 80 extend from the outlet end of the chamber in housing 56 through spokes 72, 74, respectively, to channel 76a. There is thus provided a fluid outlet from the internal chamber of emitter 54 to the exterior of pipe 52. It can be seen that mounting assembly 68 holds housing 56 centrally within pipe 52. Further, ample space is provided around housing 56 to allow water to continue flowing through the pipe substantially uninterrupted, as is most clearly seen in FIG. 7.

As is known in the art, there are other ways that housing 56 may be attached to wall 52. For instance, it could be attached to an internal surface of the pipe by heat bonding or other conventional mounting means with a connector joining the outlet end of the chamber to an aperture in the pipe. One might also conceive of ways in which a piston and cylinder, operating similarly as described, being pressure responsive, would move first and second elements relative to each other, which elements define a fluid passageway independent of the piston and cylinder. It will be understood by those skilled in the art that other changes in form and detail may be made in the preferred embodiments without departing from the spirit and scope of the invention as defined in the following claims.

What I claim is:

1. A drip irrigation emitter for use with an irrigation pipe containing pressurized fluid comprising:
   means defining a first fluid turbulence passageway having an effective cross-sectional area including first and second elements movable relative to each other for varying the length of said first passageway while maintaining the effective cross-sectional area thereof generally constant, one end of said first passageway being in communication with the exterior of the pipe when said emitter is being used with the pipe;

means associable with such a pipe for applying pressurized fluid from the pipe to the other end of said first passageway; and means responsive to pressurized fluid from the pipe for moving one of said elements relative to the other to make the length of said first passageway directly proportional to the pipe fluid pressure.

2. The emitter of claim 1 wherein said moving means includes means defining a chamber with an inlet end having an inlet communicable with the pipe interior and an outlet end having an outlet in communication with the pipe exterior, means defining a piston disposed in said chamber and being movable along a piston axis between said two chamber ends, and biasing means for urging said piston toward said inlet end.

3. The emitter of claim 2 wherein said piston means and said chamber means cooperate to limit fluid flow from said inlet end past said piston means toward said outlet, and thereby apply fluid pressure in said inlet end to said piston means for urging said piston means toward said outlet end, and further wherein said piston means has an outer lateral surface and said chamber means has an inner lateral surface adjacent said piston outer lateral surface, which lateral surfaces are said first and second elements.

4. The emitter of claim 3 wherein one of said lateral surfaces has a groove formed in it forming part of said first passageway and the other of said lateral surfaces, when disposed adjacent said groove, covers said groove, said lateral surfaces forming, in combination, said first passageway.

5. The emitter of claim 4 wherein said inlet end of said chamber is sufficiently enlarged, relative to said piston means, to allow substantially free flow of fluid therethrough relative to said first passageway.

6. The emitter of claim 5 wherein said chamber means has a cavity opening toward said piston means and in communication with said inlet, and said piston means has an end disposed adjacent said cavity sized to fit along a predetermined longitudinal length into said cavity as said piston means moves along its axis, said cavity wall and piston means end cooperating to form a second fluid passageway, when said piston means end is disposed in said cavity, allowing limited initial fluid flow therethrough into said chamber inlet end.

7. The emitter of claim 1 wherein the pipe has an aperture communicating its interior with its exterior, and said emitter is disposed inside the pipe and further comprises:

means for joining communicably said one end of said first passageway with the pipe aperture.

8. The emitter of claim 7 wherein said joining means includes rim means for retaining said emitter within the interior of a pipe in which it is disposed in a manner allowing passage of water through the pipe past said emitter, and at least one spoke joining said first passageway defining means with said rim means, said spoke being hollow and forming a duct extending between said one end of said first passageway and the outer periphery of said rim means.

9. The emitter of claim 8 wherein said rim means has an outwardly exposed channel extending around at least a portion of its periphery in communication with said duct.

10. The emitter of claim 9 which further comprises at least one other spoke and is sized sufficiently small to allow substantial fluid flow therepassed when disposed in the pipe.

11. A drip irrigation emitter for use with an irrigation pipe containing pressurized fluid comprising:

an elongate housing defining an inner chamber having an inlet at one end and an outlet at the other end, said housing being associable with the pipe such that said inlet communicates with the interior of the pipe and said outlet communicates with the exterior of the pipe;

a piston disposed in said chamber and movable between said inlet and outlet ends, said piston being sized relative to said chamber to limit fluid flow from said inlet end to said outlet end of said chamber such that pressurized fluid in said inlet end urges said piston toward said outlet end; and biasing means disposed in said housing for urging said piston from said outlet end of said chamber toward said inlet end;

said piston and housing having adjacent surfaces which cooperate to define a fluid flow turbulence-producing passageway which is longer the nearer said piston is to said outlet end of said chamber.

12. The emitted of claim 11 wherein said chamber includes a narrow portion sized to conform generally with said piston, which portion has said housing surface which cooperates with said piston to define said passageway and a wide portion disposed nearer said inlet end of said chamber relative to said narrow portion and which is substantially non-fluid flow restrictive relative to said passageway.

13. The emitter of claim 12 wherein said narrow and wide chamber portions are substantially cylindrical with the diameter of said narrow portion being smaller than that of said wide portion.

14. The emitter of claim 11 wherein said biasing means is a spring interposed said piston and said housing.

15. The emitter of claim 14 wherein $Q \propto K/S$, where Q is the rate of fluid flow through said emitter, K is the spring constant of said spring, and S is the effective surface area of said piston normal to the direction of piston movement in said chamber.

* * * * *